(12) United States Patent
Bossard

(10) Patent No.: US 6,613,132 B2
(45) Date of Patent: Sep. 2, 2003

(54) HYDROGEN DIFFUSION CELL ASSEMBLY WITH PERFORATED OUTPUT TUBE

(76) Inventor: Peter R. Bossard, 33 Oswin Turn, Langhorne, PA (US) 19047

(*) Notice: Subject to any disclaimer, the term of this patent is extended or adjusted under 35 U.S.C. 154(b) by 0 days.

(21) Appl. No.: 10/053,936

(22) Filed: Jan. 24, 2002

(65) Prior Publication Data

US 2002/0066369 A1 Jun. 6, 2002

Related U.S. Application Data

(63) Continuation-in-part of application No. 09/702,636, filed on Nov. 1, 2000, now Pat. No. 6,464,759.

(51) Int. Cl.⁷ .......................... B01D 53/22; B01D 71/02
(52) U.S. Cl. .................. 96/7; 95/56; 96/10; 55/DIG. 5
(58) Field of Search ............................. 95/55, 56; 96/4, 96/7–11; 55/DIG. 5

(56) References Cited

U.S. PATENT DOCUMENTS

| | | | | |
|---|---|---|---|---|
| 2,609,059 A | * | 9/1952 | Benedict | |
| 2,911,057 A | * | 11/1959 | Green et al. ..................... | 96/8 |
| 3,274,754 A | * | 9/1966 | Rubin .............................. | 96/8 |
| 3,279,154 A | * | 10/1966 | Emerson et al. ................. | 96/8 |
| 3,336,730 A | * | 8/1967 | McBride et al. ............... | 95/56 |
| 4,056,373 A | * | 11/1977 | Rubin .......................... | 55/158 |
| 4,220,535 A | * | 9/1980 | Leonard .................. | 210/321 R |
| 4,508,548 A | * | 4/1985 | Manatt .......................... | 55/158 |
| 4,556,180 A | * | 12/1985 | Manatt .................... | 244/135 R |
| 5,061,297 A | * | 10/1991 | Krasberg ........................ | 55/16 |
| 5,520,807 A | * | 5/1996 | Myrna et al. .......... | 210/321.75 |
| 5,711,882 A | * | 1/1998 | Hofmann et al. ........... | 210/640 |
| 5,888,273 A | * | 3/1999 | Buxbaum ....................... | 95/56 |
| 6,168,650 B1 | * | 1/2001 | Buxbaum ..................... | 95/55 |
| 6,378,352 B1 | * | 4/2002 | Bossard et al. .......... | 72/370.22 |
| 6,464,759 B1 | * | 10/2002 | Bossard et al. .................. | 96/7 |

FOREIGN PATENT DOCUMENTS

| | | | | |
|---|---|---|---|---|
| JP | 61-125422 A | * | 6/1986 | ........................ 96/8 |
| JP | 61-247606 A | * | 11/1986 | ....................... 96/8 |
| JP | 02-135117 A | * | 5/1990 | ........................ 96/8 |
| JP | 03-086219 A | * | 4/1991 | ...................... 96/10 |

* cited by examiner

Primary Examiner—Robert H. Spitzer
(74) Attorney, Agent, or Firm—LaMorte & Associates

(57) ABSTRACT

A hydrogen diffusion cell that is used to purify contaminated hydrogen gas. The hydrogen diffusion cell has a supply tube that supplies contaminated hydrogen gas into a confined area and a drain tube that removes contaminated hydrogen gas from the confined area. Hydrogen permeable coils are disposed between the supply tube and the drain tube. The hydrogen permeable coils surround a perforated output tube that draws in any hydrogen gas that diffuses through the hydrogen permeable coils. The presence and position of the output tube prevent any significant lateral movement of hydrogen gas within the diffusion cell.

18 Claims, 2 Drawing Sheets

HYDROGEN DIFFUSION CELL ASSEMBLY WITH PERFORATED OUTPUT TUBE

RELATED APPLICATIONS

This application is a continuation-in-part of patent application Ser. No. 09/702,636, entitled HYDROGEN DIFFUSION CELL ASSEMBLY AND ITS METHOD OF MANUFACTURE, filed Nov. 1, 2000, which has issued U.S. Pat. No. 6,464,759.

BACKGROUND OF THE INVENTION

1. Field of the Invention

In general, the present invention relates to hydrogen diffusion cells. More particularly, the present invention relates to hydrogen diffusion cells that contain wound coils of palladium tubing.

2. Description of the Prior Art

In industry, there are many known techniques for separating hydrogen from more complex molecules in order to produce a supply of hydrogen gas. One such technique is electrolysis, wherein hydrogen gas is obtained from water. Regardless of how hydrogen gas is obtained, the collected hydrogen gas is typically contaminated with secondary gases, such as water vapor, hydrocarbons and the like. The types of contaminants in the collected hydrogen gas are dependent upon the technique used to generate the hydrogen gas.

Although contaminated hydrogen gas is useful for certain applications, many other applications require the use of pure hydrogen. As such, the contaminated hydrogen gas must be purified. One technique used to purify hydrogen is to pass the hydrogen through a hydrogen diffusion cell. A typical hydrogen diffusion cell contains a single coil of palladium tubing. The palladium tubing is heated and the contaminated hydrogen gas is directed through the palladium tubing. When heated, the palladium tubing is permeable to hydrogen gas but not to the contaminants that may be mixed with the hydrogen gas. As such, nearly pure hydrogen passes through the palladium tubing and is collected for use.

Prior art hydrogen diffusion cells that use coils of palladium tubing have many problems. One of the major problems is that of reliability as the hydrogen diffusion cell ages. As a coil of palladium tubing is repeatedly heated and cooled, it expands and contracts. The longer the wound tube is, the more the tube expands and contracts. As the palladium tubing expands and contracts, cracks occur in the tubing. Cracks are particularly prevalent at the ends of the tubing where the palladium tubing is welded to common piping. Once a crack occurs in the palladium tubing or the welded supports of the tubing, the hydrogen diffusion cell ceases to function properly.

The problem of palladium tube cracking is amplified by the manner in which hydrogen gas is drawn out of the hydrogen diffusion cell. In a prior art hydrogen diffusion cell, hydrogen is typically drawn out of one end of the cell. This creates a one-way flow of hydrogen within the confines of the hydrogen diffusion cell as the hydrogen gas flows to one exit point within the cell. Depending upon how rapidly hydrogen gas is drawn from the hydrogen diffusion cell, the flow of hydrogen gas within the confines of the hydrogen diffusion cell can range from a constant mild flow to a sudden severe flow.

As hydrogen gas flows out of such a prior art hydrogen diffusion cell, the flowing hydrogen applies a biasing force to the palladium coils contained within the hydrogen diffusion cell. Over time, the biasing force of the flowing hydrogen physically deforms the palladium coils. The palladium coils become compressed at the end of the coils that are nearest the exit port within the hydrogen diffusion cell. This is because the flowing hydrogen gas biases the palladium coils in the direction of the flow. Likewise, the ends of the palladium coils that face away from the hydrogen gas exit port become stretched as the palladium coils are pulled away by the flowing hydrogen gas. As a result, the palladium coils become stressed in the areas where they are stretched. As the coils expand and contract when heated and cooled, the stressed areas of the palladium coils crack over time and begin to leak. Once a palladium coil begins to leak, the hydrogen diffusion cell is no longer functional.

One solution that has been attempted to increase the reliability of hydrogen diffusion cells is to decrease the length of the palladium tubing and/or the number of windings in the coil of palladium tubing. These techniques reduce the degree of deformation experienced by the palladium tubing caused by the flowing hydrogen gas. However, these techniques also greatly decrease the surface area of the palladium tubing and thus the output and efficiency of the hydrogen diffusion cell.

A need therefore exists for a new hydrogen diffusion cell that has increased reliability yet does not have decreased flow efficiency. This need is met by the present invention as it is described and claimed below.

SUMMARY OF THE INVENTION

The present invention is a hydrogen diffusion cell that is used to purify contaminated hydrogen gas. The hydrogen diffusion cell has a supply tube that supplies contaminated hydrogen gas and a drain tube that removes contaminated hydrogen gas. Hydrogen permeable coils are disposed between the supply tube and the drain tube. Disposed in the center of the hydrogen permeable coils is an output tube that collects any hydrogen that diffuses through the hydrogen permeable coils as it flows between the supply tube and the drain tube. The output tube is at least as long as the hydrogen permeable coils and is perforated along its length. In this manner, hydrogen gas is drawn into the output tube throughout the center of the hydrogen diffusion cell. This prevents hydrogen gas from flowing laterally within the hydrogen diffusion cell and deforming the hydrogen permeable coils.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE INVENTION

Figure 1:
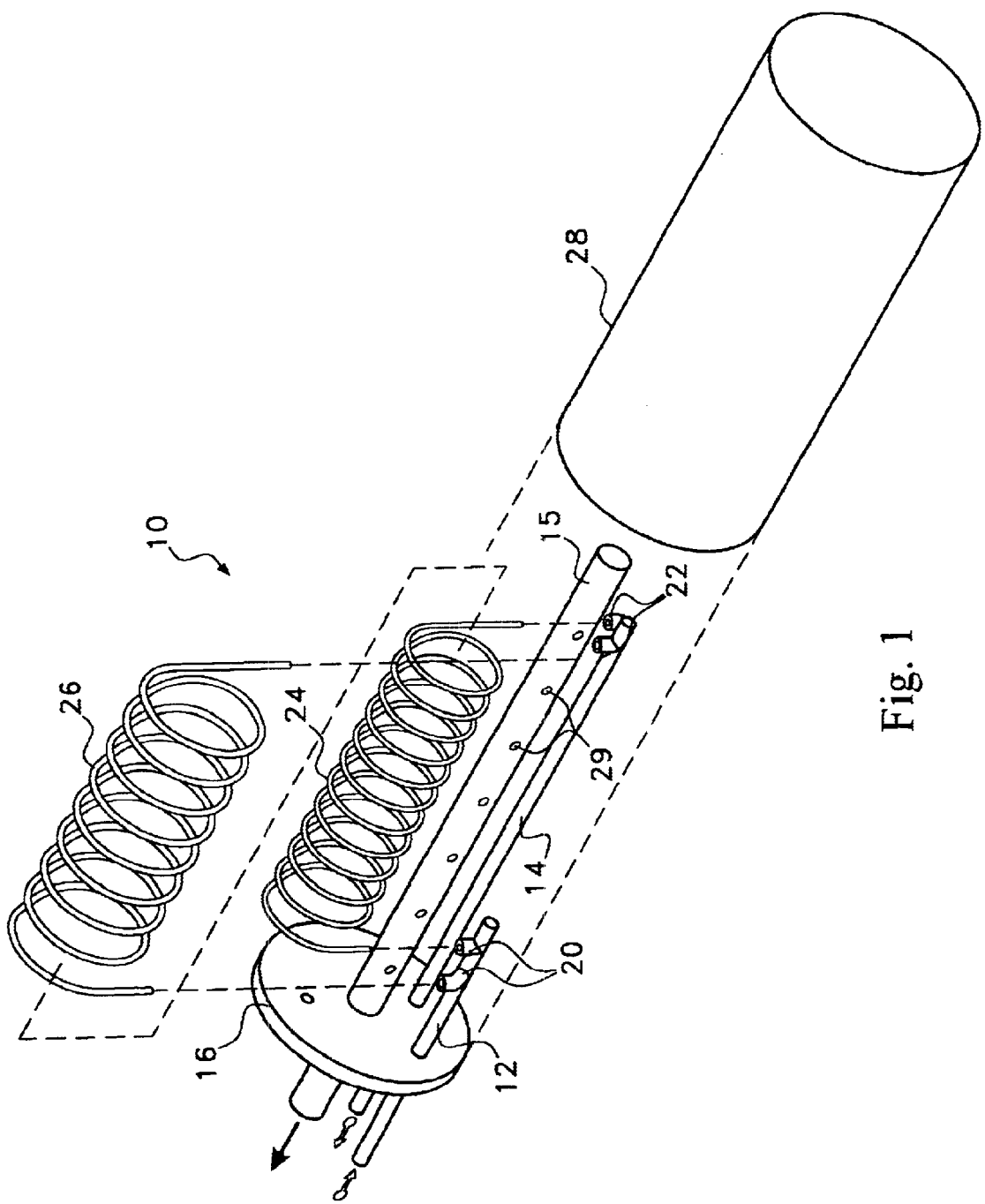
FIG. 1 is an exploded perspective view of a hydrogen diffusion cell in accordance with the present invention.

Referring to FIG. 1, a first exemplary embodiment of a hydrogen diffusion cell 10 is shown in accordance with the present invention. The diffusion cell 10 contains a supply tube 12, a drain tube 14 and an output tube 15. The supply tube 12 supplies unpurified hydrogen gas to the hydrogen diffusion cell 10. The drain tube 14 removes the unused, unpurified hydrogen gas from the hydrogen diffusion cell 10.

The output tube 15 removes purified hydrogen gas from the hydrogen diffusion cell 10. The supply tube 12, drain tube 14, and output tube 15 are all made of stainless steel or another inert high strength alloy. The supply tube 12, drain tube 14 and output tube 15 all pass through an end cap plate 16. The supply tube 12, drain tube 14 and output tube 15 are welded to the end cap plate 16 at the points where they pass through the end cap plate 16. To prevent stresses caused by expansion and contraction, the end cap plate 16 is preferably made of the same material, as is the supply tube 12, drain tube 14 and output tube 15.

On the supply tube 12 is located a clustered set of brazing flanges 20. Each brazing flange 20 is a short segment of tubing that is welded to the supply tube 12. The short segment of tubing is made of the same material as is the supply tube 12. Within each clustered set of brazing flanges 20, each brazing flange 20 is a different distance from the end cap plate 16. Furthermore, each brazing flange 20 in the clustered set radially extends from the supply tube 12 at an angle different from that of any of the other brazing flanges 20 in that same clustered set.

In the embodiment shown in FIG. 1, there is only one clustered set of brazing flanges 20 on the supply tube 12 and that clustered set contains two brazing flanges 20. Such an embodiment is merely exemplary. As will later be explained, multiple clustered sets of brazing flanges 20 can be present on the supply tube 12 and any plurality of brazing flanges 20 can be contained within each clustered set.

The drain tube 14 also contains clustered sets of brazing flanges 22. The brazing flanges 22 are of the same construction as those on the supply tube 12. The number of clustered sets of brazing flanges 22 on the drain tube 14 corresponds in number to the number of clustered sets of brazing flanges 20 present on the supply tube 12. Similarly, the number of brazing flanges 22 contained within each clustered set on the drain tube 14 correspond in number to the number of brazing flanges 20 in each clustered set on the supply tube 12.

A plurality of concentric coils 24, 26 are provided. The concentric coils 24, 26 are made from palladium or a palladium alloy. The process used to make the coils is the subject of co-pending U.S. patent application Ser. No. 09/702,637, which has issued as U.S. Pat. No. 6,378,352, entitled METHOD AND APPARATUS FOR WINDING THIN WALLED TUBING, the disclosure of which is incorporated into this specification by reference.

The number of brazing flanges 20, 22 in each clustered set corresponds in number to the number of coils 24, 26. One end of each coil 24, 26 extends into a brazing flange 20 on the supply tube 12. The opposite end of each coil 24, 26 extends into a brazing flange 22 on the drain tube 14. The concentric coils 24, 26 have different diameters so that they can fit one inside another. Furthermore, each coil has a slightly different length so that the ends of the coils align properly with the different brazing flanges 20, 22 on the supply tube 12 and the drain tube 14, respectively.

In the embodiment of FIG. 1, there are two coils 24, 26. As such, there are two brazing flanges 20 on the supply tube 12 and two brazing flanges 22 on the drain tube 14. It will be understood that more than two concentric coils can be used. In any case, the number of supply brazing flanges 20 and drain brazing flanges 22 matches the number of coils used.

The coils 24, 26 have a nearly constant radius of curvature from one end to the other. As such, the coils 24, 26 do not contain any natural stress concentration points that may prematurely crack as the coils 24, 26 expand and contract.

To further increase the reliability of the hydrogen diffusion cell 10, the brazing flanges 20 on the supply tube 12 and the brazing flanges 22 on the drain tube 14 are treated. The brazing flanges 20, 22 are chemically polished prior to brazing. Such a preparation procedure produces high quality brazing connections that are much less likely to fail than brazing connections with untreated brazing flanges.

The output tube 15 extends down the center of the hydrogen diffusion cell 10. The coils 24, 26 surround the output tube 15. As such, the output tube 15 extends down the center of the concentrically disposed coils 24, 26. The length of the output tube 15 is at least as long as the length of the coils 24, 26. As such, the output tube is present along the entire length of the coils 24, 26.

The output tube 15 is perforated along its length. The perforation enables purified hydrogen gas to pass into the output tube 15. The holes 29 used to perforate the output tube 15 can have a constant diameter. However, in a preferred embodiment, the holes 29 increase in diameter along the length of the output tube 15, as the output tube 15 extends away from the end cap plate 16. In this manner, the draw of hydrogen gas into the output tube 15 through the various holes 29 remains relatively constant along the entire length of the output tube 15.

Once the coils 24, 26 placed around the output tube 15 and are attached to both the supply tube 12 and the drain tube 14, the coils 24, 26 are covered with a cylindrical casing 28. The cylindrical casing 28 is welded closed at the end cap plate 16, thereby completing the assembly.

To utilize the hydrogen diffusion cell 10, the cell 10 is heated. Once at the proper temperature, contaminated hydrogen gas is fed into the supply tube 12. The contaminated hydrogen gas fills the coils 24, 26. Purified hydrogen gas permeates through the coils 24, 26 and is collected in the cylindrical casing 28. The purified hydrogen gas is drawn into the output tube 15. The remainder of the contaminated hydrogen gas is drained through the drain tube 14 for reprocessing.

Since the output tube 15 is located in the center of the coils 24, 26, the flow of hydrogen gas from the coils 24, 26 to the output tube 15 does not act to laterally deform the coils 24, 26. Rather, the flow of the hydrogen gas merely acts to move the coils radially inwardly. The shape of the coils 24, 26 naturally resist this force and the coils 24, 26 remain undeformed by the flow of hydrogen.

Figure 2:
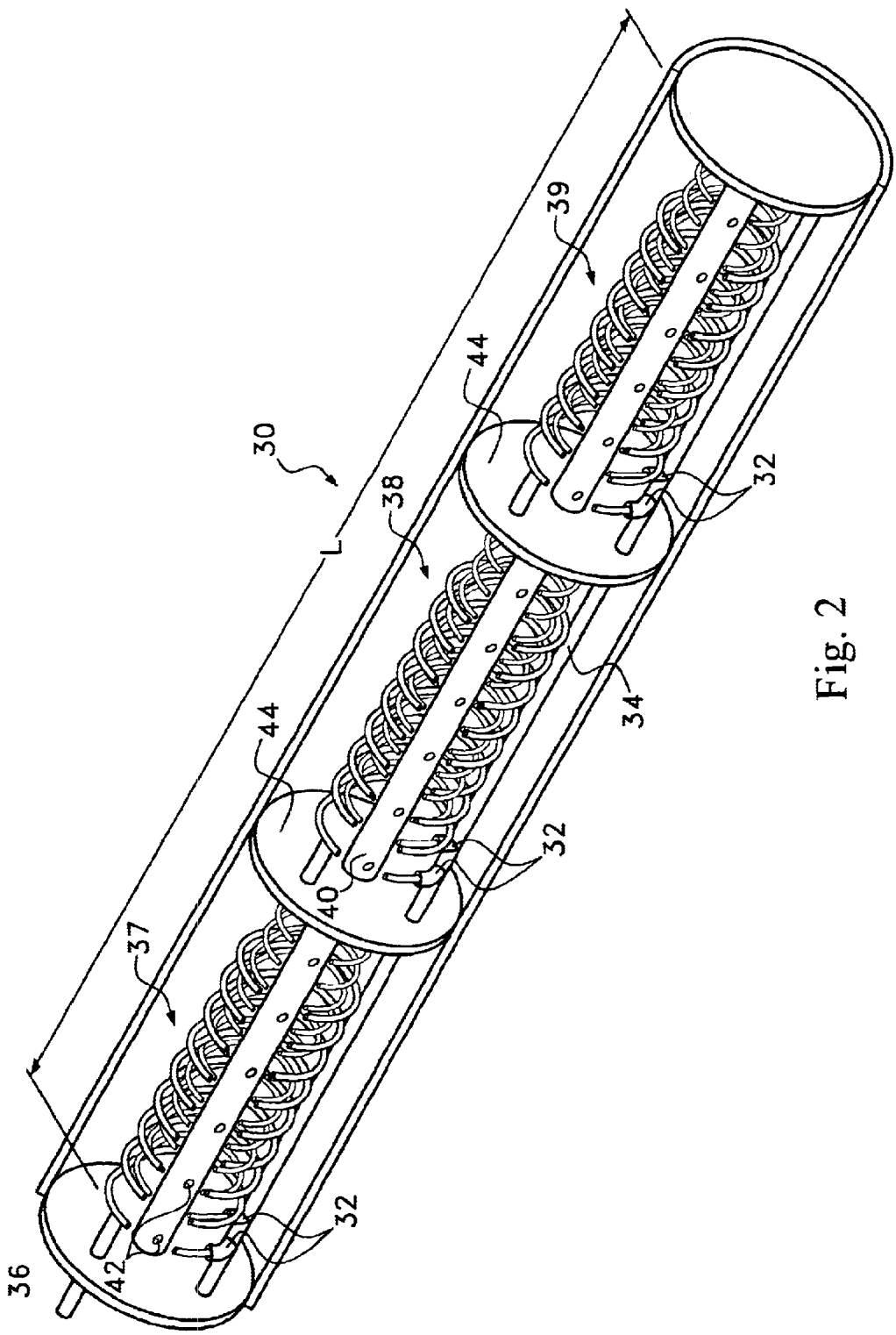
FIG. 2 is a selectively fragmented view of an alternate embodiment of a hydrogen diffusion cell in accordance with the present invention.

Referring to FIG. 2, an alternate embodiment of a hydrogen diffusion cell 30 is shown. In this embodiment, there are multiple clusters of brazing flanges 32 on both the supply tube 34 and the drain tube 36. For each cluster of brazing flanges 32, there is a set of concentric coils. In the shown embodiment, there are three clusters of supply brazing flanges 32 and three clusters of drain blazing flanges (not shown). Accordingly, there are supplied three separate sets of concentric tubes 37, 38, 39. Each set of concentric tubes 37, 38, 39 consists of multiple tubes of different diameters. The ends of the tubes are brazed to the corresponding clusters of supply brazing flanges 32 and drain brazing flanges.

The coils within the hydrogen diffusion cell 30 have a combined length L, however, no one coil in the hydrogen diffusion cell 30 extends across that length. Since shorter coils are used in series, the amount of expansion and contraction experienced by any one coil is minimized. However, the effective combined length of the various coils can be made to any length.

A single output tube 40 is used in the hydrogen diffusion cell 30. The output tube 40 has a length at least as long as the combined length L of the coil sets in the diffusion cell. The output tube 40 is perforated to receive the purified hydrogen gas emitted by the various coils. The holes 42 that create the perforations can be calibrated to create an even intake flow rate along the entire length of the output tube 40.

To help even out the intake flow of gas along the length of the output tube 40, baffle plates 44 can be placed in the hydrogen diffusion cell 30 in between different sets of concentric coils 37, 38, 39. The baffle plates 44 can be solid obstructions. However, the baffle plates 44 are preferably partial obstructions that inhibit, but do not prevent the lateral flow of hydrogen gas outside the various sets of coils 37, 38, 39 in the hydrogen diffusion cell 30.

The baffle plates 44 serve multiple functions. First, the baffle plates 44 help prevent hydrogen gas from flowing toward one end of the hydrogen diffusion cell 30. Additionally, the baffle plates help the output tube 40 receive the purified hydrogen gas with a minimal lateral movement of the hydrogen gas around the various sets of coils 37, 38, 39. Second, the baffle plates 44 reinforce the position and orientation of the supply tube 34, the drain tube 36 and the output tube 40. In this manner, the supply tube 34, drain tube 36 and output tube 40 are less likely to vibrate. This minimizes stress on these components and the coils that are supported by these components.

The use of three separate sets of coils 37, 38, 39 in the embodiment of FIG. 2 is merely exemplary and it will be understood that any number of sets can be used. Furthermore, each set of coils can contain any number of concentric coils depending upon the design requirements of the hydrogen diffusion cell 30.

There are many variations to the present invention device that can be made. For instance, the length and diameter of the coils, supply tube, drain tube and/or output tube can be changed. The number of sets of concentric coils and baffle plates can be changed. It will therefore be understood that a person skilled in the art can make numerous alterations and modifications to the shown embodiments utilizing functionally equivalent components to those shown and described. All such modifications are intended to be included within the scope of the present invention as defined by the appended claims.

What is claimed is:

1. A hydrogen diffusion cell device, comprising:

a casing defining an internal area;

at least one coil having a first end and a second end;

a supply tube extending into said casing for supplying gas to said first end of said at least one coil;

a drain tube extending into said casing for removing gas from said second end of said at least one coil; and a perforated output tube extending into said casing for removing gas that diffuses through said coil within said casing.

2. The device according to claim 1, wherein said at least one coil is hydrogen permeable.

3. The device according to claim 1, wherein said at least one coil surrounds said output tube within said casing.

4. The device according to claim 3, wherein said at least one coil extends a predetermined length within said casing and said output tube has a length at least as long as said predetermined length.

5. The device according to claim 1, wherein said output tube is perforated with holes along its length and said holes vary in diameter as a function of position along said output tube.

6. The device according to claim 1, further including at least one baffle plate contained within said casing for deterring lateral movement of hydrogen gas within said casing.

7. The device according to claim 6, wherein said at least one baffle plate is connected to said supply tube, said drain tube and said output tube.

8. A hydrogen diffusion cell device, comprising:

a supply tube;

a drain tube;

an output tube;

a first plurality of coils, each of said first plurality of coils having a first end coupled to said supply tube and a second end coupled to said drain tube, wherein each of said first plurality of coils are concentrically aligned and do not overlap;

a casing surrounding said first plurality of coils for collecting any gas that permeates out of said first plurality of coils, wherein said gas is drawn into said output tube.

9. The device according to claim 8, further including a second plurality of coils, said second plurality of coils having a first end coupled to said supply tube and a second end coupled to said drain tube.

10. The device according to claim 9, wherein said second plurality of coils includes at least one separate coil that concentrically surrounds each of said first plurality of coils.

11. The device according to claim 10, wherein both said first plurality of coils and said second plurality of coils are hydrogen permeable.

12. The device according to claim 8, wherein said first plurality of coils surrounds said output tube within said casing.

13. The device according to claim 12, wherein said first plurality of coils extends a predetermined length within said casing and said output tube has a length at least as long as said predetermined length.

14. The device according to claim 8, wherein said output tube is perforated with holes along its length and said holes vary in diameter as a function of position along said output tube.

15. The device according to claim 8, further including at least one baffle plate contained within said casing for deterring lateral movement of hydrogen gas within said casing.

16. The device according to claim 15, wherein said at least one baffle plate is connected to said supply tube, said drain tube and said output tube.

17. A method of manufacturing a hydrogen diffusion cell, comprising the steps of:

providing a casing;

providing a supply tube within said casing;

providing a drain tube within said casing;

providing an output tube within said casing; providing at least on coil having a first end and a second end;

positioning said at least one coil around at least a portion of said output tube within said casing;

coupling said first end of said at least one coil to said supply tube;

coupling said second end of said at least one coil to said drain tube.

18. The method according to claim 17, further including the step of providing at least one baffle plate within said casing.

* * * * *